United States Patent [19]

Yamasaki et al.

[11] Patent Number: 5,369,775
[45] Date of Patent: Nov. 29, 1994

[54] DATA-FLOW PROCESSING SYSTEM HAVING AN INPUT PACKET LIMITING SECTION FOR PREVENTING PACKET INPUT BASED UPON A THRESHOLD VALUE INDICATIVE OF AN OPTIMUM PIPELINE PROCESSING CAPACITY

[75] Inventors: Tetsuo Yamasaki; Kenji Shima; Shinji Komori; Koichi Munakata; Yoshie Inaoka, all of Hyogo, Japan

[73] Assignee: Mitsubishi Denki Kabushiki Kaisha, Tokyo, Japan

[21] Appl. No.: 12,624

[22] Filed: Feb. 2, 1993

Related U.S. Application Data

[63] Continuation of Ser. No. 453,579, Dec. 20, 1989, abandoned.

[30] Foreign Application Priority Data

| Dec. 20, 1988 | [JP] | Japan | 63-323118 |
| Feb. 13, 1989 | [JP] | Japan | 1-33389 |
| Apr. 17, 1989 | [JP] | Japan | 1-97194 |

[51] Int. Cl.[5] .............................................. G06F 15/82
[52] U.S. Cl. .................................... 395/800; 395/250; 395/275; 364/231.8; 364/232.22; 364/239.1; 364/DIG. 1
[58] Field of Search ............... 395/800, 325, 275, 250; 370/60, 61, 85.2, 94.1

[56] References Cited

U.S. PATENT DOCUMENTS

| 4,041,461 | 8/1977 | Kratz et al. | 395/775 |
| 4,149,240 | 4/1979 | Misunas et al. | 395/400 |
| 4,433,374 | 2/1984 | Hanson et al | 395/425 |
| 4,480,307 | 10/1984 | Budde et al. | 395/325 |
| 4,785,204 | 11/1988 | Terada et al. | 307/451 |
| 4,814,978 | 3/1989 | Dennis | 395/375 |
| 4,814,979 | 3/1989 | Neches | 187/124 |
| 4,849,968 | 7/1989 | Turner | 370/94 |
| 4,881,196 | 11/1989 | Terada et al. | 395/200 |
| 4,890,281 | 12/1989 | Balboni et al. | 370/60 |
| 4,920,534 | 4/1990 | Adelmann et al. | 370/94.1 |
| 4,928,234 | 5/1990 | Kitamura et al. | 395/425 |
| 4,953,083 | 8/1990 | Takata et al. | 395/250 |
| 4,972,315 | 11/1990 | Yamasaki et al. | 395/400 |
| 5,021,947 | 6/1991 | Campbell et al. | 395/700 |

OTHER PUBLICATIONS

Masao Iwoshita, "Memory Writing Circuit", Japanese Patent Application Public Disclosure No.: 77242/85, May 1985.

Yasuhiro Fujino et al., "Priority Control System for Data-Flow Computer", Japanese Patent Application Public Disclosure No.: 256048/87, Jan., 1987.

Masashi Fukui et al., "Fault Detection System", Japanese Patent Application Public Disclosure No.: 28731/89, Jan. 1989.

Primary Examiner—Alyssa H. Bowler
Assistant Examiner—Alpesh M. Shah
Attorney, Agent, or Firm—Wolf, Greenfield & Sacks

[57] ABSTRACT

A data-driven type computer system including an input limiting section for monitoring a current number of packets existing in the circular pipeline of the system while being processed. The input limiting section is adapted to control packets from being inputted from the external unit when the current number of packets exceeds a specified threshold value which is greater than a minimum packet number existing in the circular pipeline and which allows the attainment of the highest possible throughput of the system. The input limiting section further includes a predictive control unit to preliminarily analyze a current data flow graph to be processed in the system and also to take order in rank a possible rate of increase in the quantity of packets generated by a copying operation as well as a possible rate of reduction in the prior processing by the system. While being stored once for buffering by an input buffer, variation in the current quantity of deposited packets is predicted by the predictive control unit every time when packets are entered from an external source or from the output section, so that they are prevented from being entered by the input limiting section when the current quantity of deposited packets is in excess of the preset limit of the hardware.

12 Claims, 15 Drawing Sheets

Fig. 8

| RANK | Ni | Ci | Wsi | Wdi | Wvi | Oi | Si |
|---|---|---|---|---|---|---|---|
| 0 | 1 | 0 | 0 | 0 | 0 | 0 | 1 |
| 1 | 1 | 1 | 0 | 0 | 0 | 0 | 0 |
| 2 | 2 | 2 | 0 | 0 | 0 | 0 | 0 |
| 3 | 4 | 0 | 0 | 0 | 0 | 0 | 4 |
| 4 | 4 | 0 | 4 | 0 | 0 | 0 | 0 |
| 5 | 2 | 0 | 0 | 1 | 0 | 0 | 1 |
| 6 | 1 | 0 | 0 | 0 | 1 | 0 | 1 |
| 7 | 2 | 0 | 0 | 0 | 0 | 0 | 2 |
| 8 | 2 | 0 | 0 | 0 | 0 | 2 | 0 |

Fig. 9(a)    Fig. 9(b)

| Ri | | Ri,0 | Ri,1 | Ri,2 | Ri,3 | Ri,4 | Ri,5 | Ri,6 | Ri,7 | Ri,8 | Ri,9 |
|---|---|---|---|---|---|---|---|---|---|---|---|
| 0 | RANK 8 | 1 | 0 | | | | | | | | |
| 1 | RANK 7 | 1 | 1 | 0 | | | | | | | |
| 2 | RANK 6 | 1 | 2 | 2 | 0 | | | | | | |
| 0.5 | RANK 5 | 1 | 0.5 | 1 | 1 | 0 | | | | | |
| 0.5 | RANK 4 | 1 | 0.5 | 0.25 | 0.5 | 0.5 | 0 | | | | |
| 1 | RANK 3 | 1 | 1 | 0.5 | 0.25 | 0.5 | 0.5 | 0 | | | |
| 2 | RANK 2 | 1 | 2 | 2 | 1 | 0.5 | 1 | 1 | 0 | | |
| 2 | RANK 1 | 1 | 2 | 4 | 4 | 2 | 1 | 2 | 2 | 0 | |
| 1 | RANK 0 | 1 | 1 | 2 | 4 | 4 | 2 | 1 | 2 | 2 | 0 |

DATA-FLOW PROCESSING SYSTEM HAVING AN INPUT PACKET LIMITING SECTION FOR PREVENTING PACKET INPUT BASED UPON A THRESHOLD VALUE INDICATIVE OF AN OPTIMUM PIPELINE PROCESSING CAPACITY

This application is a file wrapper continuation of application Ser. No. 07/453,579 filed Dec. 20, 1989 now abandoned.

BACKGROUND OF THE INVENTION

This invention relates in general to a computer of a data-driven (data flow) type, arid more particularly to a data-driven computer equipped with means which prevent packets from being inputted in excess of a system's throughput at the expense of the throughput of a system.

FIG. 13 is a block diagram showing the general construction of a typical conventional data-driven type computer which is disclosed in Japanese Patent Laid-open Application No. 220,328/1987. In this drawing figure, there are seen an input section designated by the reference numeral 2 which is adapted to receive packets inputted from the outside and bring them to the inside of a computer system, a program storage section designated by 3 adapted to store a data graph and add process information to the packets inputted, a firing process section designated by 4 adapted to a wait data to be inputted, an arithmetic operating section designated by 5 adapted to perform arithmetic operations on data, and an output section designated by 6.

The following introduces the operation of the data driven type computer.

The input section 2 functions to receive a packet consisting of a tag and data from an external device, and transmit it to the program storage section 3. This program storage section 3 serves to read program information in accordance with an address to which the packet is destined, and update the packet's tag to be sent to the firing process section 4. If the received tag is of binomial operation, the firing process section 4 serves to search another packet Forming a pair with the packet sent from among those stored in a firing process store section 4a, and if it is found, it is then sent together with the received packet to the arithmetic operation section 5. If it is not found, the received packet is then stored in the firing process store section 4a, and when it is decided to be necessary to produce a copy thereof from the packet's tag which was received, a packet of the same data yet having a different destination is generated therefrom and then sent together with the received packet to the arithmetic operating section 5. Then, the arithmetic operation section 5 operates in accordance with the tag of the received packet, which is to be transmitted to the output section 6. The packet received at the output section 6 is then sent either to the input section 2 or to the external device. Following is a repeated sequence of this processing.

According to such a construction of a typical conventional computer of a data-driven type as noted above, when packets are fed one after another to the input section 2 from an external unit up to the limit of throughput of the data-driven type computer system, and if still further packets are inputted from the input section 2, or if copies of packets are taken at the firing process section 4, the number of packets deposited in the inside of the data-driven computer system would exceed the system's throughput so that no further computing operation could in practice be made. Or else, in the data-driven type processor which employs a transfer control device known as an asynchronous delay line plus a C-device (see S. Komori et al. "An Elastic Pipeline Mechanism by Self-Timed Circuit", IEEE, JSSC, Vol. 23, No. 1; pp. 111–117 (Feb., 1988); Japanese Patent Applications Nos. 136,608/1985–136,610/1985), which is operates under similar conditions, it is inevitable that the speed of packet transfer may be substantially reduced.

The present invention is essentially directed to the provision of a useful solution of such problems noted above as encountered in a conventional data-driven type computer system which results in an improved data-driven type computer system having a sufficient throughput or a high arithmetic operating rate such that there is no real possibility apprehension that the quantity of packets will exceed the throughput of the system.

SUMMARY OF THE INVENTION

The data-driven type computer system according to the present invention is advantageously provided with an input limiting section which is specifically designed to monitor a current number of packets existing in the circular pipeline of the system while being processed, and which is also adapted to control packets from being inputted from the external unit when the current number of packets exceeds a specified threshold value which is greater than a minimum packet number existing in the circular pipeline and which allows the attainment of the highest possible throughput of the system.

According to the advantageous construction of the present invention such that any further packets are controlled from being inputted from an external unit when the current number of packets is in excess of the threshold preset at a specified value which is more than the minimum allowable number of packets in the circular pipeline for the attainment of the highest possible throughput of the system, there is no possibility of a reduction in the desired throughput of the system, and consequently, it is possible in practice to perform arithmetic operations with an abundant reserve of throughput therefore avoiding any reduction in the throughput of the system, which thereby contributes helps prevent such circumstances that could result in a slow-down in the rate of packet transfer or in an undesirable stalling in the system's operations.

According to another advantageous aspect of the data-driven type computer system of the present invention, it is constructed such that a predictive control means is provided in the part of the input section, which is adapted to preliminarily analyze a current data flow graph to be processed in the system and also to take order in rank a possible rate of increase in the quantity of packets generated by a copying operation as well as a possible rate of reduction in the prior processing period by the system. While being stored once for buffering by an input buffer, variation in the current quantity of deposited packets is predicted by the predictive control means every time when packets are entered from an external source or from the output section, so that are prevented from being entered by the input limit means when the current quantity of deposited packets is in excess of the preset limit of the hardware.

By virtue of such an advantageous construction of the input section according to the present invention any variance in the quantity of packets deposited in the system may be predicted every time there is an input from an external source or from the output section, on the basis of which the current quantity of packets is prevented from entering from outside, it is practicably possible that the entering of packets from outside may then be controlled in accordance with the throughput of the hardware as well as a current state of processing of a data flow graph of the system, and so that the possibility of stalling in the operational execution and reduction in the packet transfer speed of the system may well be removed accordingly.

Incidentally, the general construction of a store unit which is employed in the program store section of a data-driven type computer system to which the present invention is concerned is such as follows;

FIG. 15 is a schematic diagram showing a typical conventional store unit which is shown, for example, in "1986 Mitsubishi Semiconductor Data Book; IC Memory" No. 4-11 issued from Mitsubishi Electric K.K. In the drawing, there are shown a row input buffer designated by the reference numeral 11, a column input buffer by 12, a row address decoder 13, a column address decoder 14, a memory cell array 15, a sense amplifier 16, an output buffer 17, an input data controller 18, a read/write controller 19, an address input 20, a data input/output 21, and a control input 22.

Next, the operation of this store unit will now be explained.

When reading data, an address given from the address input 20 is held in the row input buffer 11 and the column input buffer 12. The address as held in such buffers is then decoded at the row address decoder 13 and the column address decoder 14, respectively. There is selected a memory cell which corresponds to the address as obtained from the selection in terms of row and column from the decoded address through the memory cell array 15. Data which is stored in that selected memory cell is determined by way of the sense amplifier 16, the result of which is then outputted from the data input/output 21 through the output buffer 17. This reading of data is controlled by the read/write controller 19. In the writing of data, the input buffer 11, the column input buffer 12, the row address decoder 13 and the column address decoder 14 operate in a similar manner, whereby a memory cell is selected which may correspond to an address thus decoded and selected in terms of the row and column from the memory cell array 15. In this step, data is then stored as a data for the memory cell selected through the input/output data controller 18. This writing of data is controlled by way of the read/write controller 19.

With the arrangement of the typical conventional store unit for storing the program as noted above, as it is required to maintain addresses to be given during the reading or writing even after address decoding has been completed, and for this reason, no further address may be given owing to the reading or writing to follow, this was an inevitable problem in an attempt to attain the high-speed processing of the system.

For the solution of such problems noted above, it is an object of the present invention to provide an improved store unit which can perform efficient address decoding for the writing or reading to follow during the previous operation of reading or writing, and which can thus operate at a high speed.

In this respect, a store unit for storing programs according to the present invention is essentially directed to the provision of memory cell array selection by way of decode addresses which are held by a temporary store means which is specifically adapted to temporarily hold addresses decoded by an address decoder.

With the provision of the store unit for storing programs according to the present invention which is provided with the temporary store means for decoded addresses, which allows a memory cell array to be selected by way of a decode address held therein, it is practicably possible to start the decoding of addresses for the reading or writing to follow immediately after the address decoder has once completed the decoding, thus making it possible in practice to attain high-speed.

BRIEF DESCRIPTION OF THE DRAWINGS:

FIG. 8 is an illustrative chart showing the analysis data obtained from the execution of the flow chart shown in FIG. 5;

FIG. 9A and 9B are an illustrative chart showing the increase rate in the data flow graph shown in FIG. 6 and that in each cyclic operation of the system;

Figure 1:
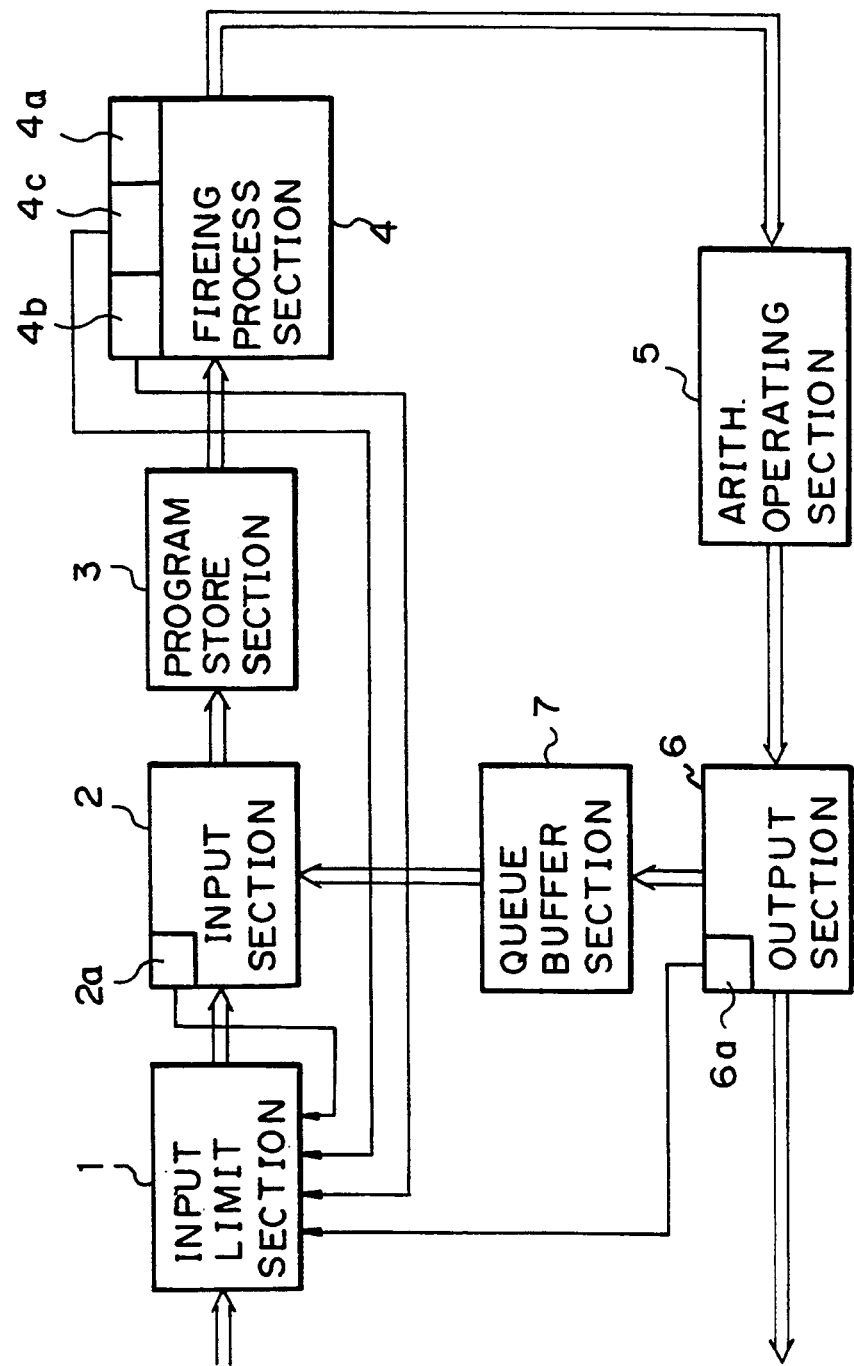
FIG. 1 is a block diagram showing by way of a preferred embodiment the construction of a data-driven type computer .system of the present invention.

DETAILED EXPLANATION OF THE PREFERRED EMBODIMENTS:

FIG. 1 is a block diagram showing the general construction of a typical data-driven type computer system, in which like reference numerals designate like or identical parts. In the drawing, there are shown an input limit section designated by 1 adapted to limit the entry of excess packets from an external unit, a detector 2a adapted to detect the entry of packets from the input limit section 1, an binomial operational/absorption command detector 4b adapted to detect an binomial operation or an absorption of packets at a firing process section 4, a copy detector 4c adapted to detect that a copying operation is performed at the firing process section 4, and an output packet detector 6a adapted to detect that a packet was outputted from the output section 6 into an external unit.

Figure 2:
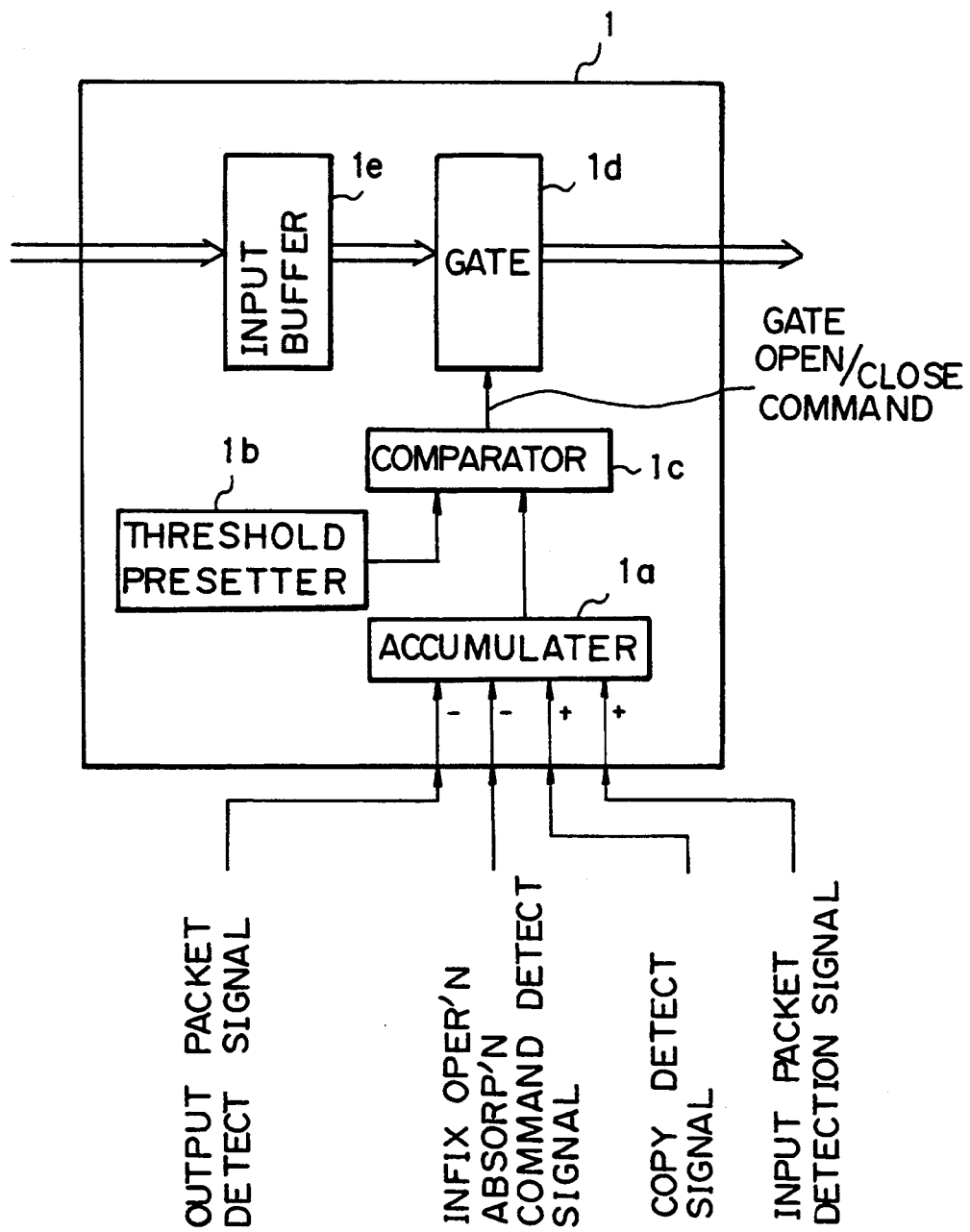
FIG. 2 is a block diagram showing the construction of an input limit section for use with the preferred embodiment of the present invention.

FIG. 2 is a block diagram showing the construction of the input limit section 1 noted above, wherein there are shown provided an accumulator 1a which is adapted to receive and accumulate the output of the entered packet detector and of the copy detector, and the inverted output of the binomial operation/absorption command detector and of the outputted packet detector, a threshold presetter 1b for presetting the threshold of packet number, a comparator 1c for comparting the outputs of the accumulator 1a and of the threshold presetter 1b, a gate 1d for limiting the passage of packets accordingly to a gate open/close command which is the output from the comparator 1c, and an input buffer 1e for storing packets temporarily.

Next, the operation of the present invention will be explained.

Referring now to FIG. 1, a packet with a tag and data entered from an external unit into the input limit showing 1 is taken into the input buffer 1e shown in FIG. 2, and when the gate 1d is open, it will then be entered into the input section 2, while the gate 1d is closed, it will be stored in the input buffer 1e. A first value stored in the accumulator 1a and a second value preset in the threshold presetter 1b are compared by the comparator 1c, and if the first value is smaller than the second value, the gate 1d is opened, and while the first value is greater than the second value, the gate 1d is closed. When the packet is entered into the input section 2, the input packet detector 2a may detect this, and then output a detect signal to the input limit section 1. The output value from the accumulator 1a is then incremented by one upon the receipt of the input packet detect signal.

The packet entered into the input section 2 is now sent out to the program store section 3. The program store section 3 will then serve to read a program information in accordance with an address of destination of the received packet, and transmit it to the firing process section 4 after having updated the tag of this packet. If the operation which is specified in the tag of this packet is for an binomial operation, the firing process section 4 will search a packet which is paired with that packet received and stored in the firing process store section 4a, and if it is found therein, will send it together with the received one to the arithmetic operating section 5. If the operation specified in the tag of the received packet is for a copying operation, the firing process section 4 will then generate a packet with the same data yet with a different tag from the original packet, and send them together to the arithmetic operating section 5, and if the operation specified in the packet received is for monodic operation, this packet will immediately be sent to the arithmetic operating section 5. In this ease, if that operation on the firing process section 4 is for binomial operation or for absorption, the binomial operational/absorption command processing section 4b will detect this and then output a detect signal to the input limit section 1. The output value from the accumulator 1a may be decremented by one upon the receipt of this the binomial operational/absorption command detect signal. When that operation on the part of the firing process section 4 is for a copying action, the copy detector 4c will detect this, and then output a detect signal to the input limit section 1. The output value from the accumulator 1a may be incremented by one upon the receipt of this copy detect signal.

The arithmetic operating section 5 will operate arithmetically in accordance with the tag of the received packet, and then output the result to the output section 6. The packet sent to the output section 6 will then be transmitted to a queue buffer 7 in accordance with an address of designation given, or outputted to an external unit. The output packet detector 6a will detect when the packet is outputted to the external unit, and then output a detect signal to the input limit section 1. The output value from the accumulator 1a is then decremented by one upon the receipt of this output packet detect signal.

The packet entered into the queue buffer 7 will, when it is vacant, be sent as it is to the input section 2, and when another packet is stored in the queue buffer 7, it will be stored behind or in the back of this other packet stored therein.

Next, the threshold which was preset in the threshold presetter 1b will be reviewed.

Figure 14A:
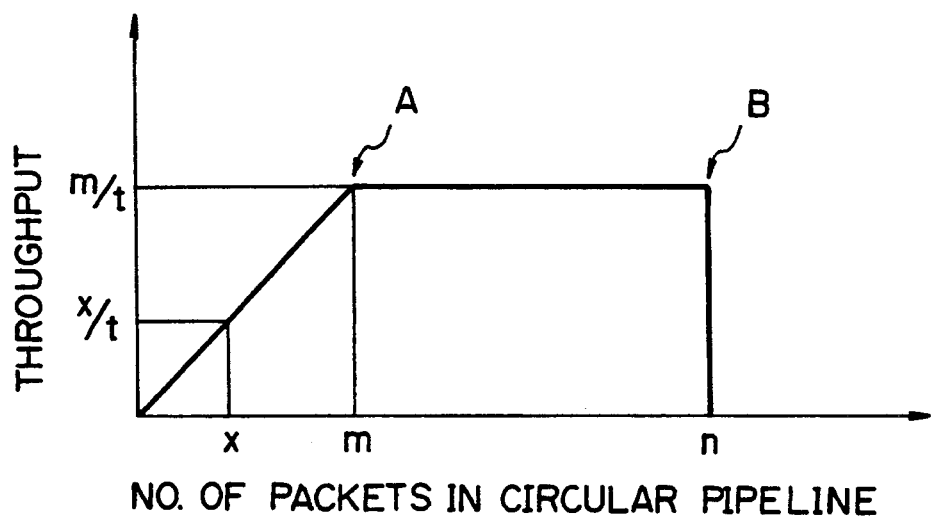
FIGS. 14A and 14B are a graphic representation showing the relationship of the number of packets existing in circular pipeline and the throughput of the system.
Figure 14B:
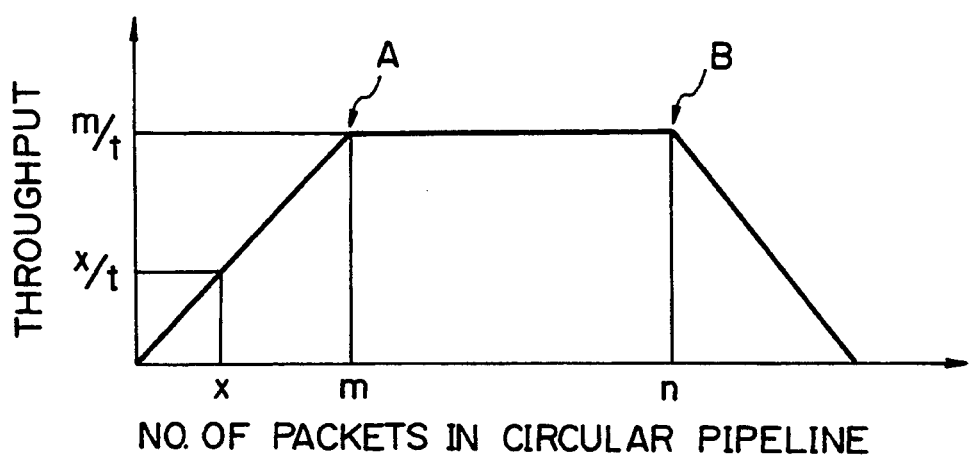
Figure 15:
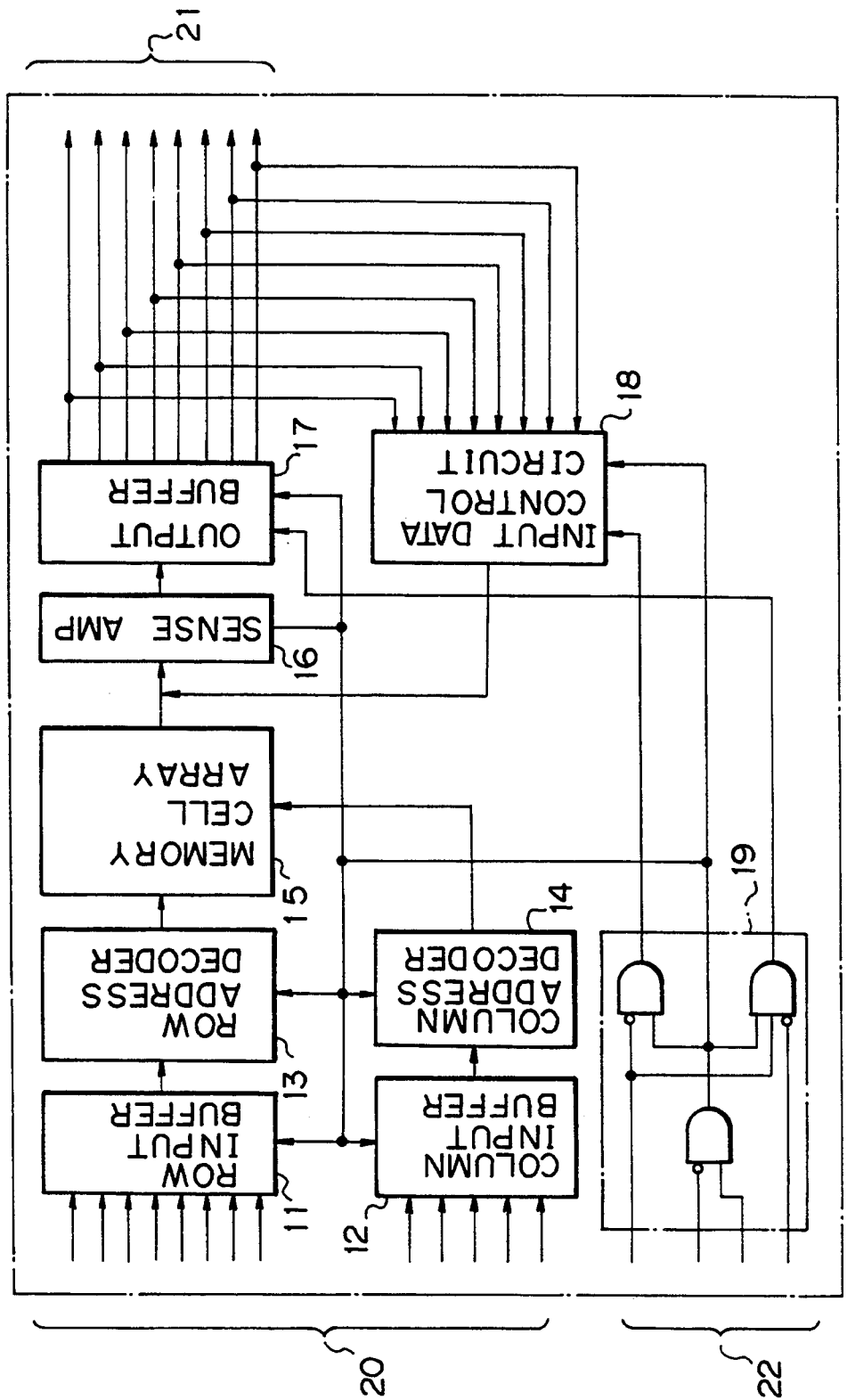
FIG. 15 is a schematic circuit diagram showing the general construction of a typical conventional construction program storing section.

Now, referring to FIG. 1, let us hereinafter call a circular pipeline which comprises the input section 2, the program store section 3, the firing process section 4, the arithmetic operating section 5, the output section 6, and the queue buffer 7. This circular pipeline has the following characteristics as with the common pipeline operation, as follows. FIG. 14 is a graphic representation which shows the relationship between a current number of packets existing in the circular pipeline and the throughput of the system, in which FIG. 14(a) shows the case wherein a synchronous clock is adopted, while FIG. 14(b) shows the case wherein an asynchronous path of transfer. When there is existing a single packet in the circular pipeline, only a single operation can be performed within the period of time t spent for a complete circulation of the circular pipeline by a packet, which means a throughput of 1/t, while if there exist two packets in the circular pipeline, two cycles of operation may be done within the period of t, which means a throughput of 2/t. In general, assuming that there are a number x of packets in the circular pipeline, x times of operation can be performed within the period of t, which results in a throughput of x/t. However, should there be x or an increasing number of packets in the circular pipeline, there may normally exist a threshold m, where m times of operation can only be done within the given period of t (point A). m is equal to a current number of packets which occupies the whole part of the pipeline excuting the queue buffer 7, which means no further increase in throughput of the system, even if the number of packets increase, because there are a certain number of packets held by the queue buffer. This is a minimum number of packets existing in the circular pipeline which allows the pipeline to be operated at the highest possible throughput of operation. If the number x increases up to n, the entire circular pipeline including the queue buffer would be filled up with packets going beyond the throughput of the system, which would then result in the reduction in transfer rate of packets along the circular pipeline as shown in FIG. 14(b), or else would make it impracticable to increase the number of packets any more, or rather making it impossible to continue any further arithmetic operation in the system (point B). In other words, it is to be noted that this circular pipeline exhibits the highest possible throughput with the number x of packets ranging from the values of m through n, accordingly.

With a threshold of the threshold presetter 1b of the system being preset at "s", when there exist more than s of packets in the circular pipeline under the control of the input limit section 1, the gate 1d is closed, and then any further packets entering from an external unit will be caused to wait at the input buffer 1e. With this arrangement, it is practicable to avoid the possibility that the number of packets existing in the circular pipeline would go far beyond the preset number s, otherwise, it may continue increasing by entering from the external units. In the meantime, when an binomial operation is executed or an absorbtion of packets is performed at the firing process section 4, or else packets are outputted from the output section 6 to an external unit, thus making the gate 1d open, packets stored in input buffer 1e are then entered into the input section 2 with the number of packets existing in the circular pipeline being maintained at the value of s or more.

In the preferred embodiment of the present invention, in an attempt to hold the throughput of the system as high as desired, the above-mentioned threshold s is made equal to the value of m above, which is a minimum number of packets existing in the circular pipeline for the purpose of attaining the highest possible throughput of the circular pipeline. In addition, according to the present embodiment, in consideration of a situation where all the packets entering from the input section and existing in the pipeline are put to be copied, the storage capacity of the queue buffer is set to be the value of m or greater so that the values may have a relationship of $n > 2$ m.

In this manner, according to the present preferred embodiment, there is provided an input limitation section 1 which effects to limit the entering of packets into the input section 2, and the current number of packets in the circular pipeline is monitored as to whether it may be greater or smaller than the value of m, the minimum number of packets for attaining the highest possible throughput of the pipeline to control the entering of packets from the external units. With this arrangement, it is now impossible in practice for the current number of packets existing in the pipeline to go far beyond the value of m, and also that the current number of packets in the pipeline be maintained positively to be greater than the value of m, thus eliminating the possibility that arithmetic operation be unable owing to hardware shortcoming during the operation, while maintaining constantly the system throughput at a maximal level; accordingly.

While it is explained by way of the present embodiment that is adapted to monitor the current number of packets which may be transferred into or out of the circular pipeline and which may increase or decrease in the pipeline, it is of course practicable to alternatively monitor the whole states of circular pipeline to obtain the total number of packets existing therein, or supervise as to whether packets may exist in the queue buffer, and if any packets exist in the queue buffer, inhibit any further entrance of packets thereinto from the external unit, and if no packet exists in the queue buffer, then allow further entering of packets.

With this arrangement according to the present invention, there is provided in a data-driven type computer system including the input section, the program store section, the firing process section, the arithmetic operating section, the output section and the queue buffer section, the improvement which comprises, as summarized in brief, a packet number detecting means adapted to detect a current number of packets existing in the circular pipeline, and an input control means adapted to control the entering of packets into the input section from an external unit in such a manner that when the current number of packets is smaller than a preset threshold, which is preset at a value more than a minimum number of packets existing in the circular pipeline for attaining the highest possible throughput thereof, the entering of packets from the external unit may be allowed into the input section, while the current number of packets is greater than the preset threshold, the entering of packets from the external unit may be inhibited into the input section, whereby there is attained a useful data-driven type computer system which can maintain an as high as possible throughput of operation, and which is free from a deadlock in operation owing to hardware shortcoming which would otherwise be unable to handle any further arithmetic operation, accordingly.

Now, this is to further the detail of the present invention by way of a second preferred embodiment thereof. It is to be noted that the advantageous features of a data-driven type computer system according to the second embodiment of the invention resides essentially in the provision of an input control section, which is adapted to preliminarily store packets entered into the input section or from an external unit and receive packets entered internally from the output section of the system, predict changes in the number of packets deposited every time that such packets are entered, compare the thus-predicted number with an allowable value of a hardware which was set preliminarily, and limit any further entering of packets from the outside while the predicted value goes in excess of the preset value.

Figure 3:
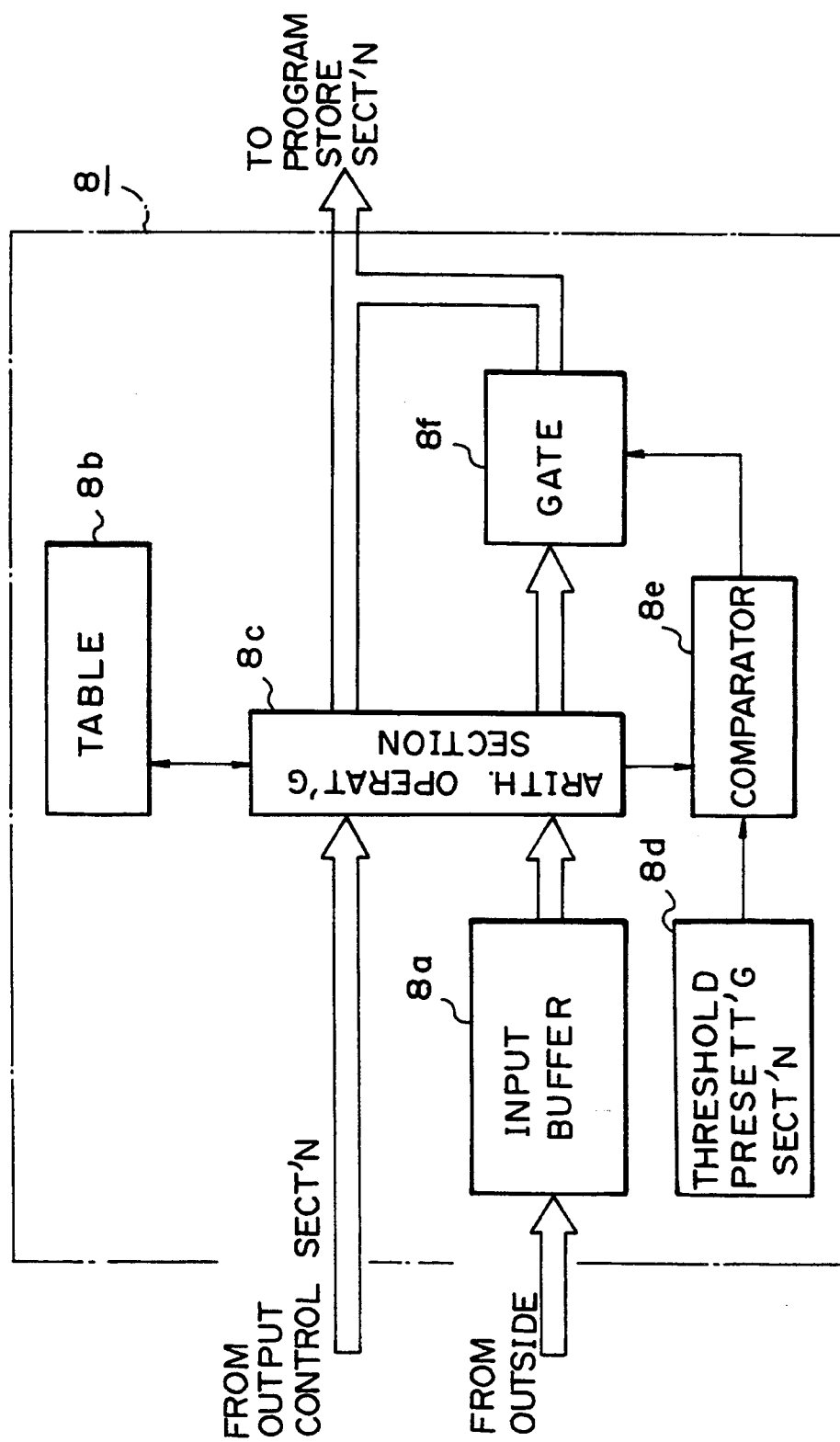
FIG. 3 is a block diagram showing the general construction of an input control section by way of a second embodiment of the present invention.

FIG. 3 is a block diagram showing the general construction of an input control section 8 reduced to practice by way of the second embodiment of the invention, wherein there are shown provided an input buffer 8a for storing preliminarily entered packets from the outside, a table or predictive control means 8b for storing a chart showing the rates of increase and reduction of packets per each rank as obtained from the analysis of a data flow graph as well as changes in the number of the whole packets in the system, an arithmetic operation unit or predictive control means 8c for receiving packets entered from the input buffer and the output section and read the values of rates of increase and reduction of packets per rank and the chart of changes of the whole packets from the table 8b by way of packets' tags to calculate values for the chart of changes and record them in the table 8b and to output thus-obtained values to a comparator 8e, a threshold presetting section 8d for storing threshold as preset (hardware s allowable value) and a comparator or limit means 8e for comparing the value of the chart of changes outputted from the arithmetic operation unit 8c with the threshold outputted from the threshold presetting section 8d to output a gate open/close signal in accordance with the result of the comparison, and a gate or limit means 8f for limiting the passage of packets entering from the input buffer 8a through the arithmetic operation unit 8c accordingly with the open/close signal from the comparator 8e.

Figure 4:
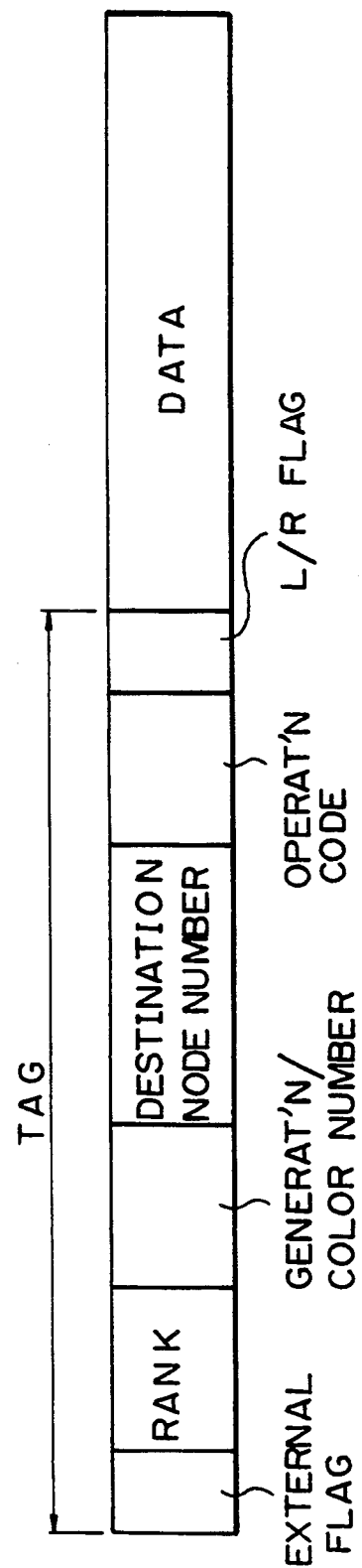
FIG. 4 is a schematic view showing the construction of a packet entered into a data-driven type computer system of the present invention.

FIG. 4 is a constructional chart showing the packet format for use with a data-driven type computer system, in which a packet is shown comprising a tag information section and a data section, said tag information section is further comprised of an external flag, a rank value, a generation number or a color number, a destination node number, an operating code, and L/R flag.

Figure 5:
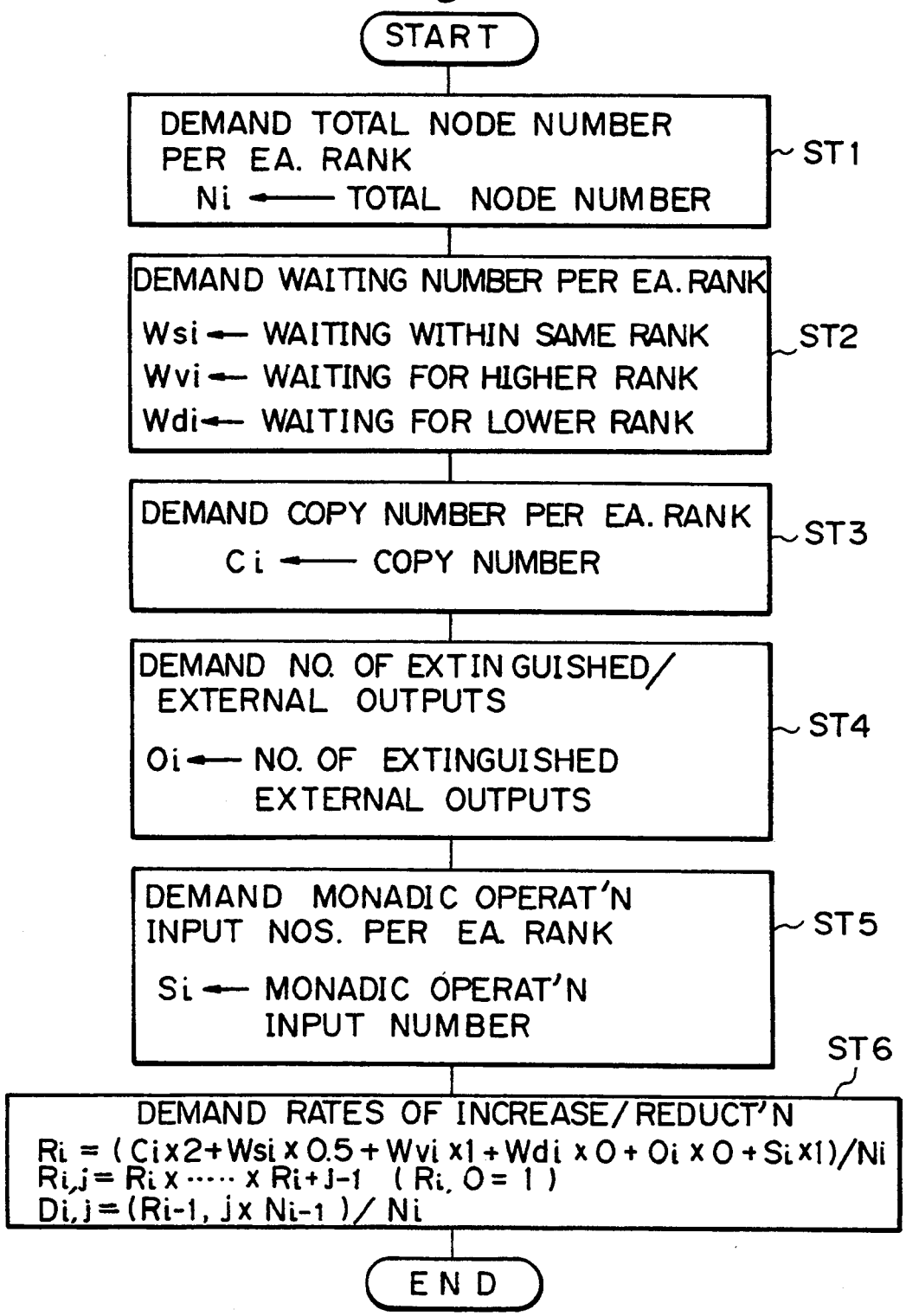
FIG. 5 is a flow chart depicting the operation to obtain the rates of increase and reduction of packets in the system.

Next, this is to present by way of the flow chart of FIG. 5 how to calculate the rate of increase of packets to be stored preliminarily into the table 8b, as follows.

Figure 6:
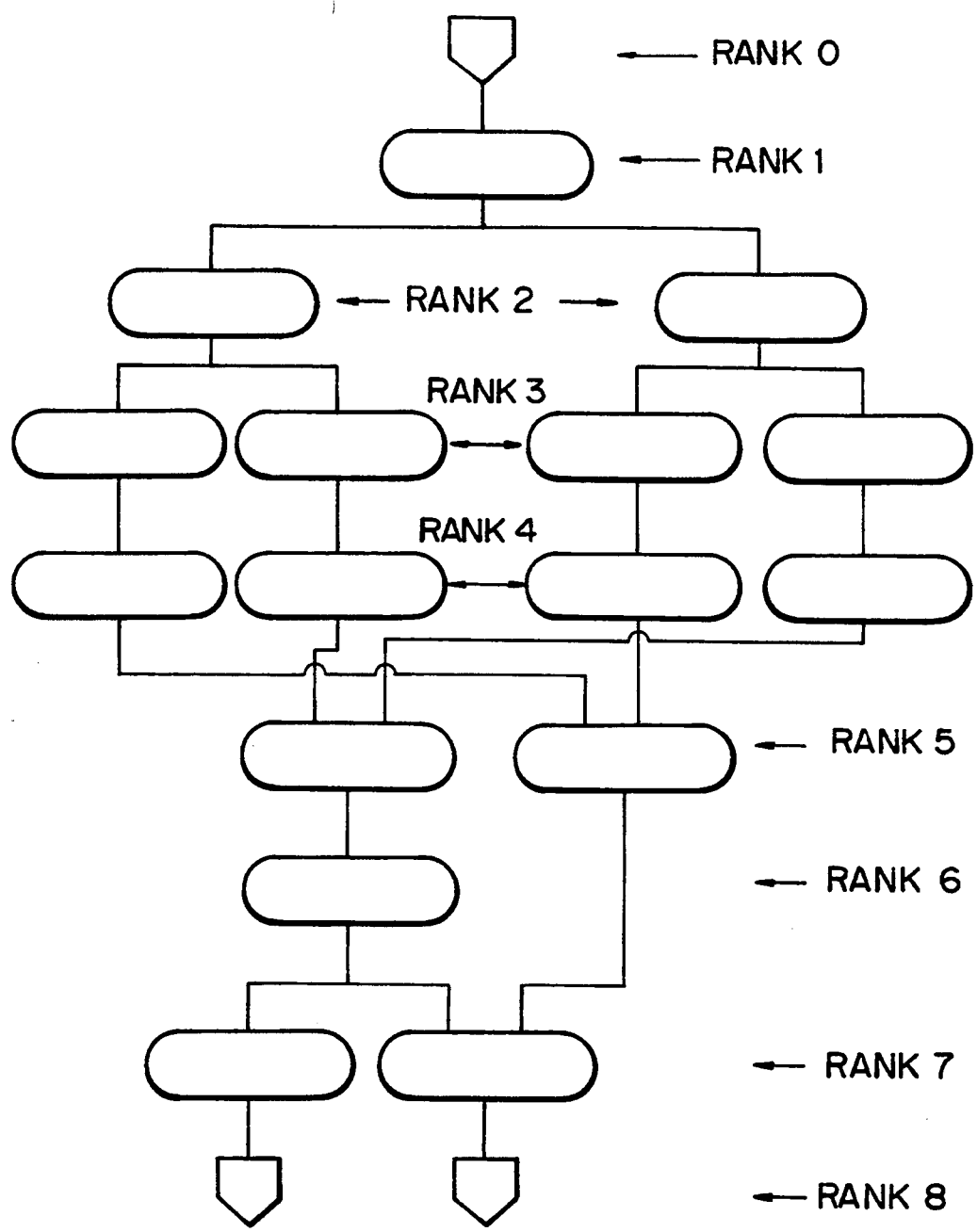
FIG. 6 is a data flow graph or programing chart showing an example of the contents of processing.

Assuming that the data flow graph shown in FIG. 6 is executed, firstly obtain a node number Ni per each rank (step ST1), and then a queue number shown below per rank (step ST2).

Wsi: Number of queue in the same rank

As shown in FIG. 7(b), number of packets queueing in the same rank (corresp. packets D and E) for an binomial operation packet F.

Wdi: Number of queue with respect to a lower rank

Figure 7:
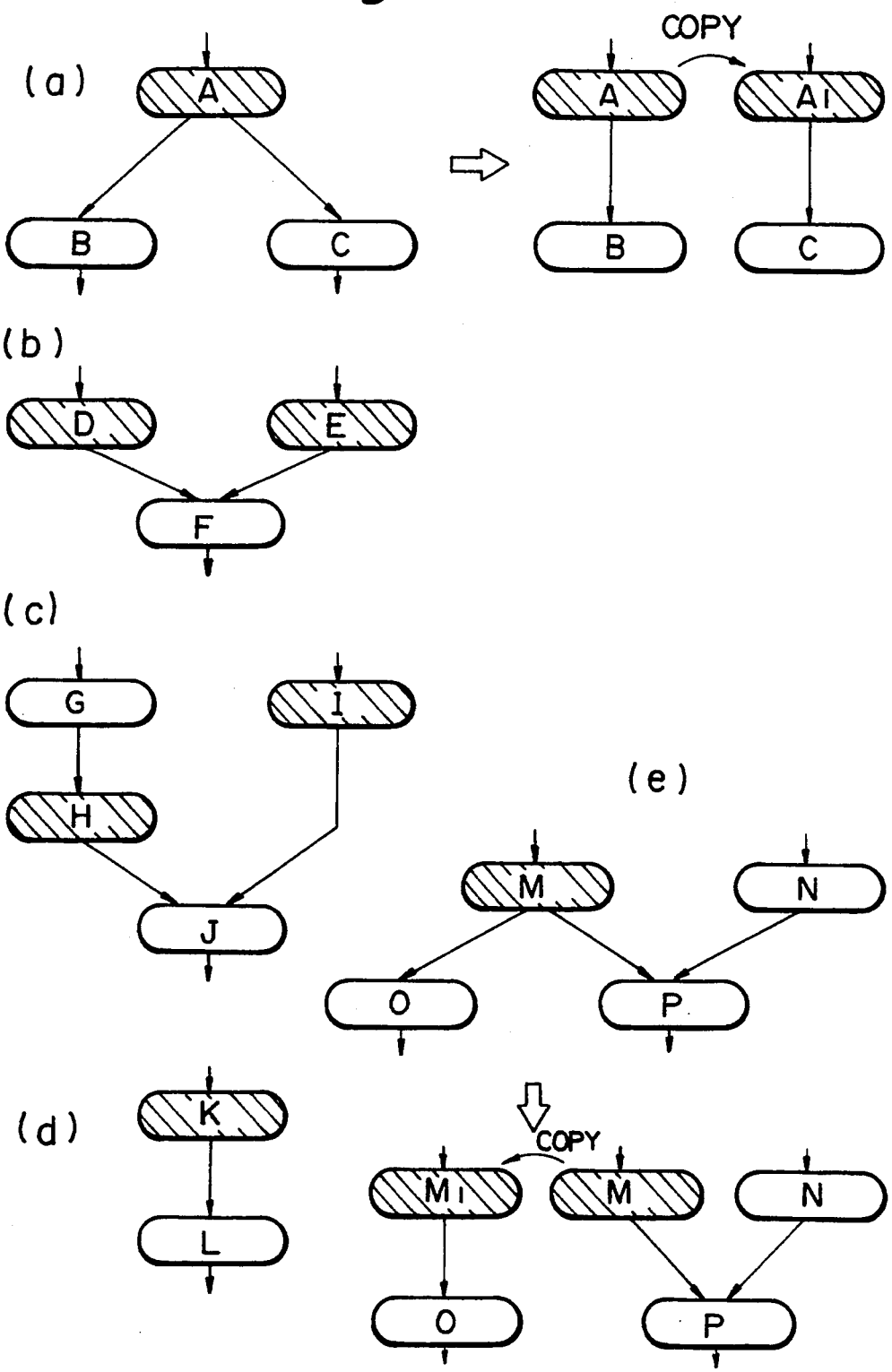
FIG. 7 is an illustrative diagram showing the manner of analysis in the data flow graph.
Figure 10:
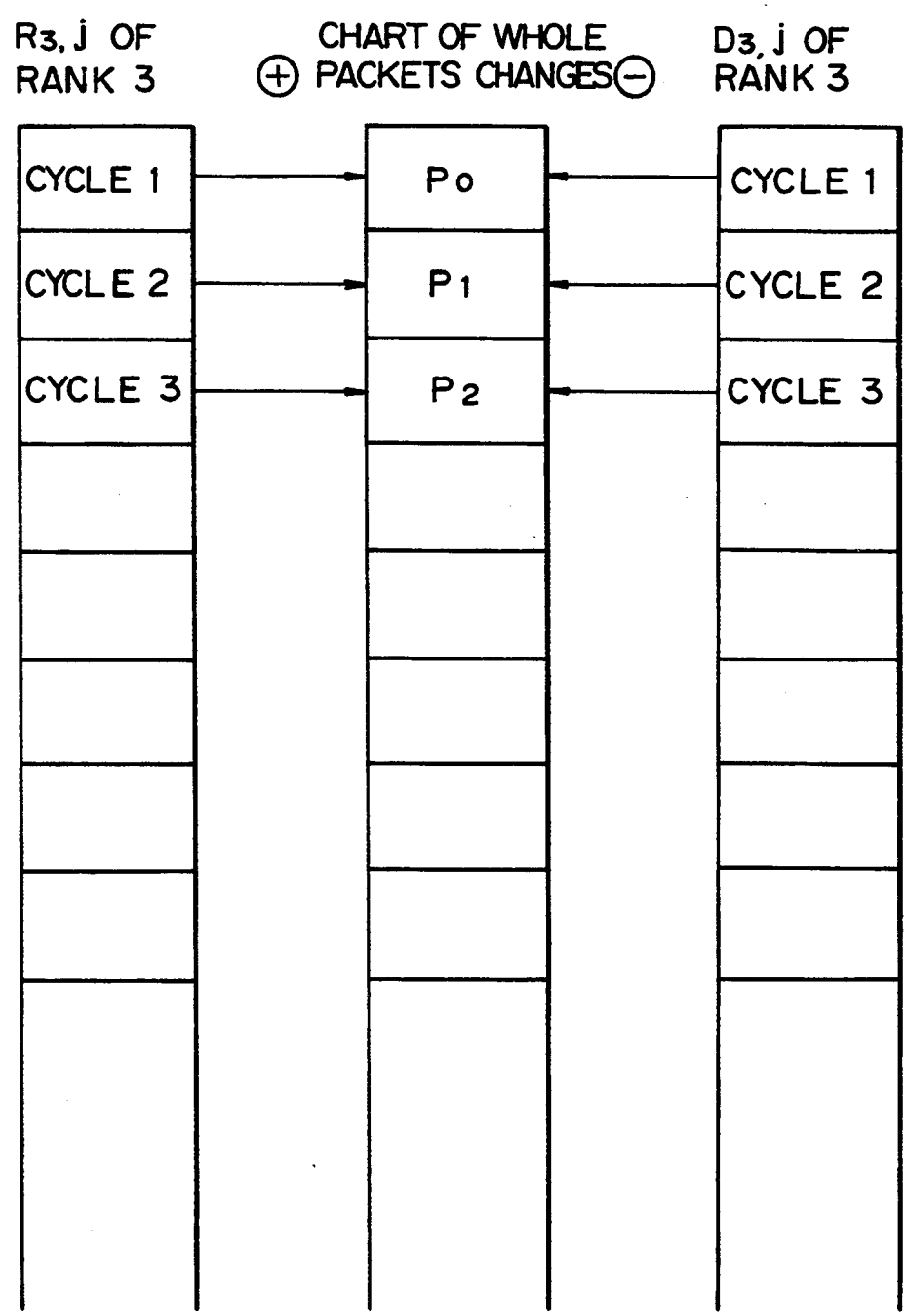
FIG. 10 is an illustrative chart showing the manner of preparing the chart of changes of packets.

As shown in FIG. 7, number of packets queueing in the higher rank with respect to an binomial operation packet J (corresp. packet I).

Wvi: Number of queues with respect to the higher rank

As shown in FIG. 7(e), number of packets queueing in the lower rank (corresp. packet H) among those queueing with respect to an binomial operation packet J.

After taking the desired number of queues in Step ST2, taken is the number of copies Ci (step ST3). For example, when two packets are to be outputted from the packet A as shown in FIG. 7(a), the packet A is copied once, making each input packet for the packets B and C, thus the number of copies Ci of the packet A making 1. Provided that an objective packet is excluded when taking the number of queueing noted above.

Taking the current number of packets extinguished or outputted outwardly per each rank (step ST4), thereafter obtained is the number of input packets Si into a monadic operation packet per each rank. In this connection, the monadic operation packet means an arithmetic operational packet with a single input as with the packet L shown in FIG. 7(d), which input packet comes to be the packet K.

However, exclusive are any packets which were made objective when taking the number of queueing noted above. Also, as shown in FIG. 7(e), while the packet M is now made objective when obtaining the number of queues, yet not objective when obtaining the number of copies, the copied packet M1 comes to be an input packet for the monadic operation packet 0 (which corresponds to the case of rank 6 in FIG. 6).

A table wherein each of such parameters was obtained is FIG. 8, and if the rate of increase Ri per each rank is defined from such parameters as shown in the following equation, there is obtained a chart of FIG. 9(a).

$$Ri = (Ci \times 2 + Wsi \times 0.5 + Wdi \times 0 + Wvi \times 1 + Oi \times 0 + Si \times 1)/Ni \quad (1)$$

where, i corresponds to a current number of ranks.

When obtained is a rate of increase from the equation (1) above, there are known the rate of increase Ri, j and that of reduction Di, j (i=0, 1 ... 8; j=0, 1 ...) per each rank as defined in the equations below [see FIG. 9(b)](step ST6);

$$Ri,j = Ri \times \ldots \times Ri+j-1 \text{ (provided } Ri,o=1) \quad (2)$$

$$Di,j = (Ri-i,j \times Ni-1)/Ni \text{ (provided that the rate of reduction of the rank 0 is 0)} \quad (3)$$

where, j corresponds to a number of cyclic operation per each rank.

Then, thus-obtained rates of increase and reduction from the equations (2) and (3), and the chart of changes off the whole packets per each cyclic operation (the initial value for each cyclic operation is to be 0) are stored into the table 8b.

Incidentally, the rates of increase and reduction off packets in the present invention denote the current number of packets as obtained in the J-th cyclic operation with the number of packets being 1 per each rank.

The following is the explanation on the operation, wherein as the operation of the entire data-driven type computer system was stated in the chapter relating to the prior art, it is omitted here, and this is to explain on the operation of the input section 8 according to the present invention.

In the case that an entered packet is from the outside, it is entered by way of the input buffer 8a, while in the case of entry made internally from the output section 6, it is entered directly into the arithmetic operation unit 8c. In this arithmetic operation unit 8c, using the value of rank which is part of tag information on the entered packet, the rates of increase and reduction as well as the value of changes may be read from the table 8b, and the chart of changes may be updated accordingly to the following equations, that is;

$$P0' = P0 + Ri.0 + Di.0 \text{ (first cycle)}$$

$$P1' = P1 + Ri.1 + Di.1 \text{ (second cycle)} \quad (4)$$

where, P0, P1 ... are values of changes per each operation cycle as read from the chart of changes, which are made 0 of the initial value, and which are calculated for a new value of change (P0', P1'. . . ) which corresponds to each packet every time that a new packet is entered.

Newly calculated values of changes are outputted to the comparator 8e upon the updating of the chart of changes in the table 8b, and compared with the threshold as entered from the threshold presetting unit 8d. At the same time, packets entered internally are outputted as they are.

From this result of comparison, when a value of change in the chart of changes is found greater than the threshold, the comparator 8e will output a close signal to the gate 8g, and when it is found smaller, the comparator will then output an open signal thereto. It functions to control the inputs in such a manner that when the gate 8f receives a close signal, it will return a packet entered from the outside to the input buffer 8a, and when it receives an open signal, the entered packet will be passed through.

On the other hand, as stated hereinbefore, the circular pipeline exhibits the characteristic performance as shown in FIG. 14. In this respect, the following function may be attained. Assuming that the threshold presetting section 8d shown in FIG. 3 has a threshold "n", it will serve to control the input in such a manner that when comparing the values of changes as calculated by the arithmetic operation unit 8c with the threshold at the comparator 8e, to decide that the change value goes beyond the threshold n, then closes the gate 8f and return the entered packet to the buffer, while comparing such values of charges calculated by the arithmetic operation unit 8c with the threshold from the comparator 8e to eventually furnish the gate 8f with a direction of opening/closing accordingly.

With such arrangement, the current number of packets existing in the circular pipeline may be maintained constantly to be not greater than the threshold of n, thus attaining a stable throughput of the system.

Figure 11:
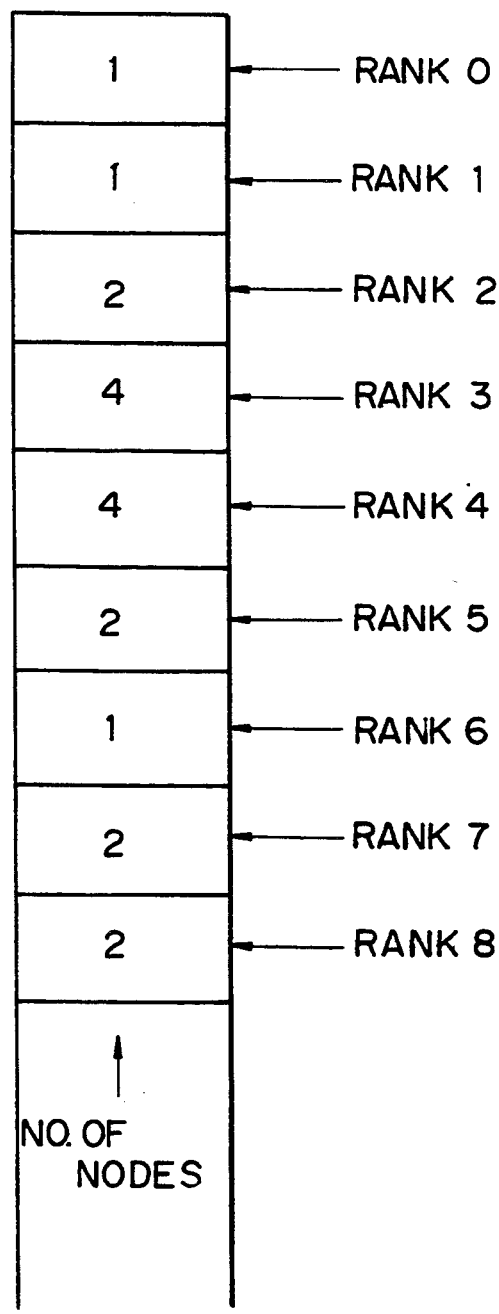
FIG. 11 is a schematic chart showing data on a number of nodes in practice by way of another embodiment of the invention.

While shown is the embodiment noted above wherein the tag information of packets includes rank values therein, it would of course bring a similar useful effect if a table of node numbers per each rank (FIG. 11) is stored in the table 8b so that a rank value may be obtained from a specified node number of tag information at the arithmetic operation unit 8c during the operation.

According to the present invention as reviewed fully hereinbefore, there is attained a useful construction of a data-driven type computer system such that packets entered from the outside are buffer-stored once, and also that changes in the number of packets as deposited every time that they are entered from the outside or inputted internally from the output section may be predicted from the predetermined rates of increase and reduction thereof, and limit the entry of packets from the outside while the number of deposited packets comes in excess of the predetermined value of threshold, there is attained such advantageous effects that there is no possibility hardware would become unable to operate owing to shortage of resources during the operation, which results consequently in a stable throughput of the system, as well as in a flexible control of the system in accordance with a given program.

Next, the following is an explanation of the program store unit for use in a data-driven type computer system according to the present invention by way of a preferred embodiment thereof.

Figure 12:
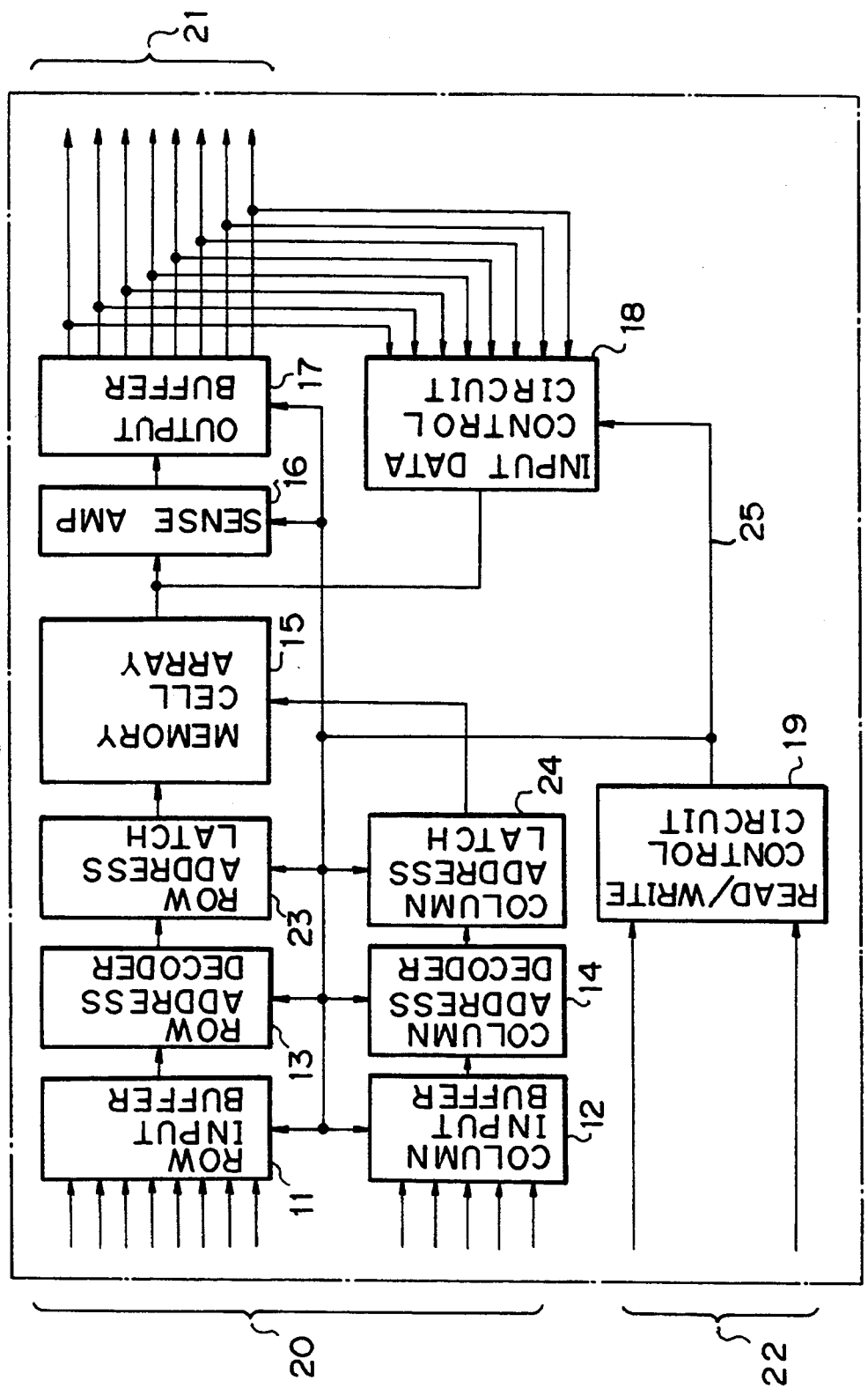
FIG. 12 is a schematic view showing a preferred embodiment of a store unit for use in the program storing section of a data-driven computer system of the invention.
Figure 13:
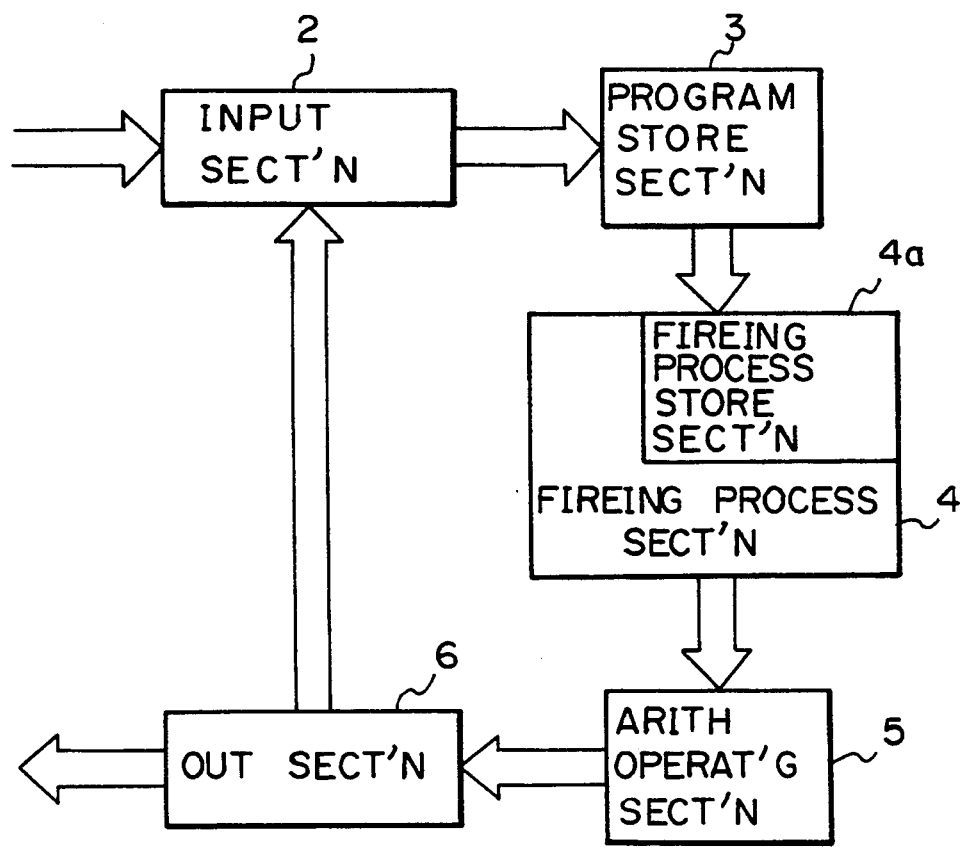
FIG. 13 is a block diagram showing the construction of a typical conventional data-driven type computer system.

FIG. 12 is a schematic circuit diagram showing by way of a preferred embodiment of the invention a program score unit for use with a data-driven computer system, wherein there are shown a row input buffer designated by 11, a column input buffer 12, a row address decoder 13, a column address decoder 14, a memory cell array 15, a sense amplifier 16, an output buffer 17, an input data control circuit 18, a read/write control circuit 19, an address input 20, a data input/output 21, a control input 22, a row address latch 23, and a column address latch 24, and also designated by 25 one or a plurality of read/write control signals.

The following is an explanation of the operation.

When reading data, it is seen that an address applied from the address input 20 is held by the row input buffer 11 and column input buffer 12. This address held by such means is then decoded by the row address decoder 13 and the column address decoder 14, respectively. The thus-decoded address is now held by the column address latch 23 and the column address latch 24, respectively. Thereafter, the address held in the row input buffer 11 and the column input buffer 12 is no longer necessary, and then another address for a reading or a writing may now be entered, so that address decoding is started for the next reading or writing. Then, a memory cell 5 will be selected which is among those decoded and held in the above-mentioned buffer means and which corresponds to time given address through the selection in terms of the row and column thereof. The data stored in the memory cell which was selected is now determined by the sense amplifier 16, and the result of this decision is then outputted from the data input-/output 21. The reading of such data is now controlled by way of the read/write control circuit 19. When writing data, the row input buffer 11, the column input buffer 12, the row address decoder 13 and the column address decoder 14 operate in the like sequence as noted above, whereby there is attained an address decoded accordingly. The thus-decoded address is then held by a row address latch 23 and a column address latch 24, respectively. Thereafter, the address held in the row address buffer 11 and the column address buffer 12 is no longer necessary, and, another address can now be entered for a next reading or writing, so that address decoding is started for the next reading or writing. Then, a memory cell 5 will be selected which is among those decoded and held in the above-mentioned buffer means and which corresponds to the given address through the selection in terms of the row and column thereof. In this case, a given data is stored as the one for the selected memory cell by way of the input data control corresponds 18. The reading of such data is now controlled by way of the read/write control circuit 19.

While the foregoing description on the preferred embodiment of the invention was given taking by example a semiconductor memory, it is to be noted that the addressing mechanism in the store unit of the invention is adaptable in any applications, other than the preferred embodiment, wherein a given address is decoded and a desired data is selected among those as stored by way of addresses thus decoded, which may naturally bring a similar effect to that mentioned hereinbefore.

While there is shown herein the embodiment of the invention wherein a latch is employed as the store means, it will be apparent to those skilled in the art that this means is not necessarily restricted to a latch, but any means that serves the function of storing data may be adapted equally.

With an advantageous construction according to the present invention fully disclosed herein such that a memory cell may be selected with an output from the address decoder which is held temporarily, it is possible in practice to enter an address for a next reading or writing, once decoding of an address is finished, thus allowing the decoding of an address for the next reading or writing even during the previous reading or writing operation. As a consequence, therefore, there is attained an advantageous effect such that the data reading or writing operation may be performed partly in an overlapped relationship with an operation to follow, which may serve a high-speed store unit in the computer system with the mere provision of this storage means for decoded addresses, accordingly.

What is claimed is:

1. A data flow processing system for processing packets, each packet containing a tag said tag pointing to a program instruction, and data, said system comprising:

an input section for receiving input packets to be processed and releasing said packets for processing, and a processing pipeline for processing said packets released from said input section and for performing arithmetic operations;

said input section including:

means for determining a predicted number of packets that will enter the input section, each time that a quantity of packets are entered, by a variance in the quantity of packets entered, means for storing a value of a preset threshold that reflects a processing pipeline capacity, means, responsive to a determination by the determining means, for comparing the predicted number of packets with the preset threshold value from the means for storing said value, to determine if the predicted number exceeds the preset threshold, and an input limiting section, responsive to a determination that the predicted number of packets exceeds the threshold, for receiving the received input packets and for delaying a release of additional packets into the processing pipeline, said input limiting section not delaying and thereby allowing additional packets into the processing pipeline when the predicted number of packets is less than the threshold.

2. A data flow processing system as recited in claim 1 wherein the processing pipeline further comprises a program store section coupled to the input limiting section for receiving packets from the input limiting section and, for each packet, retrieving a program instruction based on the tag of the packet wherein said program instruction is used to generate a new tag that is output along with data in the packet.

3. A data flow processing system as recited in claim 2 wherein said program store section is a store unit which further comprises:

an address decoder adapted to convert an address specifying a storage location of data into a into a location on a memory cell array, and the memory cell array adapted to store data, and a means adapted to temporarily hold a result of decoding of said address decoder in such a manner that decoding of an address for a next reading or writing is performed by said address decoder, while the memory cell array is selected by way of the decoded address as held in said holding means for reading or writing.

4. A data flow processing system as recited in claim 2 further comprising a firing processing section for receiving the new tag and the data output from the program store section, wherein said firing processing section comprises:

means for determining if the new tag points to a program instruction that is a dual operand operation;

a memory for temporarily holding packets;

means for searching the memory to locate a packet having a matching tag for the new tag when the program instruction pointed to by the tag is a dual operand operation and for outputting the packet and the packet having the matching tag to the arithmetic operating section.

5. A data flow processing system as recited in claim 4 wherein the firing processing section further comprises:

a copy means for generating a duplicate packet of the packet received by the firing processing section when the program instruction pointed to by the tag of the received packet is a copying operation, wherein both packets are output from the firing processing section to the arithmetic operating section.

6. A data flow processing system as recited in claim 5 further comprising:

means for forwarding the packet received by the firing processing section to an arithmetic operating section when the tag of the received packet points to a program instruction that is a single operand operation.

7. A data flow processing system as recited in claim 2 wherein the input limiting section further comprises a buffer for temporarily storing packets received at the input section when the input limiting section is preventing additional packets from entering the processing pipeline.

8. A data flow processing system as recited in claim 2 further comprising an output section coupled to the arithmetic processing section for receiving processed packets from said arithmetic processing section and, for each received packet, checking a flag in the tag of the packet to determine whether to output the packet or to send the packet to the input section.

9. A data flow processing system for processing packets, as is claimed in claim 1, wherein the tag further comprises:

an external flag, a rank value, a generation or color number, a destination node number, and a L/R flag.

10. A data flow processing system for processing packets, each packet containing a tag said tag pointing to a program instruction, and data, said system comprising:

an input section for receiving input packets to be processed and for releasing said packets for processing, and a processing pipeline for processing said packets released from said input section and for performing arithmetic operations;

said input section including:

means for determining a number of packets currently in the processing pipeline, means for storing a value of a preset threshold, means, responsive to a determination by the determining means, for comparing the number of packets currently in the pipeline with the threshold value from the means for storing said value, the threshold value being greater than a minimum number of packets required to optimize throughput of the pipeline, to determine if the number of packets currently in the pipeline exceeds the threshold value;

an input limiting section, responsive to a determination that the number of packets currently in the pipeline exceeds the threshold, for receiving the received input packets and, for delaying a release of additional packets into the processing pipeline, said input limiting section allowing additional packets into the processing pipeline otherwise; and wherein the means for determining the number of packets currently in the processing pipeline comprises an accumulator which receives increment-/decrement signals from a plurality of detectors that detect operations to be performed on the packets, wherein the accumulator increments or decrements a count of the number of packets currently in the processing pipeline based upon the received signals and outputs a signal indicative of the number of packets currently in the processing pipeline to the means for comparing.

11. A data flow processing system for processing packets, each packet containing a tag said tag pointing to a program instruction, and data, said systems comprising:

an input section for receiving input packets to be processed and releasing said packets for processing, and a processing pipeline for processing said packets released from said input section and for performing arithmetic operations;

said input section including:

means for determining a predicted number of packets that will enter the input section, each time that a quantity of packets are entered, by a variance in the quantity of packets entered, means for storing a value of a preset threshold that reflects a processing pipeline capacity, means, responsive to a determination by the determining means, for comparing the predicted number of packets with the preset threshold value from the means for storing said value, to determine if the predicted number exceeds the preset threshold, and an input limiting section, responsive to a determination that the predicted number of packets exceeds the threshold, for receiving the received input packets and for delaying a release of additional packets into to the processing pipeline, said input limiting section allowing additional packets into the processing pipeline otherwise; and wherein the means for determining the predicted number of packets comprises:

a table for storing charts and for outputting a signal indicative of the rates of increase and reduction of the predicted number of packets according to a rank included in each tag of each packet; and an arithmetic operating unit for receiving packets from an input buffer and an output section, and for computing the predicted number of packets using the signal output from the table and the rank of the received packets.

12. A data flow processing system for processing packets, each packet containing a tag said tag pointing to a program instruction, and data, said system comprising:

an input section for receiving input packets to be processed and for releasing said packets for processing, and a processing pipeline for processing said packets released from said input section and for performing arithmetic operations;

said input section including:

means for determining a number or a predicted number of packets currently in the processing pipeline, means for storing a value of a preset threshold, means, responsive to a determination by the determining means, for comparing the number of packets currently in the pipeline with the threshold value from the means for storing said value, the threshold value being greater than a minimum number of packets required to optimize throughput of the pipeline, to determine if the number of packets currently in the pipeline exceeds the threshold value;

an input limiting section, responsive to a determination that the number of packets currently in the pipeline exceeds the threshold, for receiving the received input packets and, for delaying a release of additional packets into the processing pipeline, said input limiting section allowing additional packets into the processing pipeline otherwise; and wherein the input limiting section comprises:

an input buffer for receiving input packets, for temporarily storing the input packets and for outputting the packets;

a gate for delaying or allowing the packets output by the input buffer to pass to the processing pipeline in accordance with the determination signal output by the means for comparing.

* * * * *